United States Patent
Lee

(10) Patent No.: US 8,875,741 B2
(45) Date of Patent: Nov. 4, 2014

(54) PRESSURE DAMPING DEVICE FOR BRAKE SYSTEM

(71) Applicant: Mando Corporation, Pyeongtaek-si (KR)

(72) Inventor: Chung Jae Lee, Seongnam-si (KR)

(73) Assignee: Mando Corporation, Gyeonggi-do (KR)

(*) Notice: Subject to any disclaimer, the term of this patent is extended or adjusted under 35 U.S.C. 154(b) by 0 days.

(21) Appl. No.: 13/864,077

(22) Filed: Apr. 16, 2013

(65) Prior Publication Data

US 2013/0269815 A1    Oct. 17, 2013

(30) Foreign Application Priority Data

Apr. 17, 2012  (KR) .................... 10-2012-0039834

(51) Int. Cl.
| | | |
|---|---|---|
| *F16L 55/04* | (2006.01) | |
| *B60T 8/48* | (2006.01) | |
| *B60T 8/40* | (2006.01) | |
| *B60T 17/04* | (2006.01) | |

(52) U.S. Cl.
CPC ............... *B60T 17/04* (2013.01); *B60T 8/4872* (2013.01); *F16L 55/04* (2013.01); *B60T 8/4068* (2013.01)
USPC ............................................. 138/31; 138/30

(58) Field of Classification Search
CPC ..... B60T 8/4291; B60T 8/4068; B60T 17/04; F15B 2201/205; F15B 2201/312; F15B 2201/4155; F15B 1/24

USPC ............ 138/31, 30; 303/113.1, 113.5, 116.1, 303/116.4, 116.5
See application file for complete search history.

(56) References Cited

U.S. PATENT DOCUMENTS

| | | | | |
|---|---|---|---|---|
| 2,789,581 | A | * | 4/1957 | Kerr ................................ 138/31 |
| 3,434,286 | A | * | 3/1969 | Raizes ............................ 60/535 |
| 3,467,140 | A | * | 9/1969 | Hanson .......................... 138/31 |
| 3,886,746 | A | * | 6/1975 | Farr ............................. 60/547.1 |
| 4,886,321 | A | * | 12/1989 | De La Broise et al. .. 303/122.09 |
| 4,989,924 | A | * | 2/1991 | Toda et al. ................. 303/113.1 |
| 5,385,395 | A | * | 1/1995 | Volz ........................... 303/116.1 |
| 7,093,911 | B2 | * | 8/2006 | Hool et al. ................. 303/113.5 |
| 8,534,772 | B2 | * | 9/2013 | Park ........................... 303/113.1 |
| 8,579,385 | B2 | * | 11/2013 | Schepp et al. ............. 303/116.1 |

FOREIGN PATENT DOCUMENTS

| | | |
|---|---|---|
| JP | 06-191387 | 7/1994 |
| KR | 20-1998-0034388 | 9/1998 |
| KR | 1020120011183 A | 2/2012 |
| KR | 10-2012-0018416 | 3/2012 |
| KR | 10-1197467 | 11/2012 |

OTHER PUBLICATIONS

Office action dated Aug. 9, 2013 from corresponding Korean Patent Application No. 10-2012-0039834 and the English translation from Google Translate.

* cited by examiner

*Primary Examiner* — Patrick F Brinson
(74) *Attorney, Agent, or Firm* — Ladas & Parry, LLP

(57) ABSTRACT

There is provided a pressure damping device for a brake system. According to an embodiment of the present invention, an air damping space whose volume is changed in accordance with pressure is provided in an oil passage for connecting two hydraulic circuits, thereby reducing a pressure pulsation generated by a liquid pressure.

8 Claims, 3 Drawing Sheets

PRESSURE DAMPING DEVICE FOR BRAKE SYSTEM

CROSS-REFERENCE TO RELATED APPLICATION

This application claims the benefit of Korean Patent Application No. 2012-0039834, filed on Apr. 17, 2012 in the Korean Intellectual Property Office, the disclosure of which is incorporated herein by reference in its entirety.

BACKGROUND

1. Field

Embodiments of the present invention relate to a pressure damping device for a brake system, and more particularly, to a pressure damping device for a brake system that may reduce noise and improve pedal feel by minimizing a pressure pulsation when braking.

2. Description of the Related Art

In general, a brake system for braking is essentially mounted to a vehicle, and in recent years, many kinds of systems to obtain more powerful and stable braking force have been proposed. Among these, in a hydraulic braking system, two hydraulic circuits are provided to control two wheels, and a pressure damping device for reducing a pressure pulsation is provided in an oil passage for connecting the two hydraulic circuits.

A pressure damping device according to the related art may connect outlet sides of pumps provided in each hydraulic circuit so as to dampen a liquid pressure discharged from the pump. In this instance, as shown in FIG. 1, the pressure damping device 1 includes a single piston 2 at a center thereof and a spring 3 at both ends thereof, so that the piston 2 is moved to both sides in accordance with the liquid pressure to reduce a pressure pulsation.

Specifically, the pressure damping device 1 includes two liquid pressure holes 4 respectively connected with the hydraulic circuit on both sides of a housing 5 for housing the piston 2, and pushes the piston 2 to reduce a pressure pulsation when a liquid pressure is transmitted to any one of the two liquid pressure holes 4.

However, in the pressure damping device 1 according to the related art, the pressure pulsation is reduced only by the load of the spring 3, and therefore proper pedal feel cannot be provided to a driver due to the lack of damping effect.

In addition, the moving piston 2 bumps against both side surfaces of the housing 5, and therefore durability of the piston 2 is reduced and noise is generated when it is used for a long time.

Therefore, there is a demand for a pressure damping device that may reduce operating noise and improve pedal feel by minimizing a pressure pulsation.

SUMMARY

Therefore, it is an aspect of the present invention to provide a pressure damping device for a brake system that may include an air damping space provided in an oil passage for connecting two hydraulic circuits so that the volume of the air damping space is changed depending on pressure, thereby reducing a pressure pulsation generated by a liquid pressure.

Additional aspects of the invention will be set forth in part in the description which follows and, in part, will be obvious from the description, or may be learned by practice of the invention.

In accordance with one aspect of the present invention, a pressure damping device for a brake system that is provided in an oil passage of a hydraulic block so as to connect first and second hydraulic circuits for respectively controlling a liquid pressure transmitted to two wheels, the pressure damping device includes: a cylindrical housing that is fixed to the oil passage includes a first liquid pressure hole and a second liquid pressure hole respectively communicating with a main oil passage of the first and second hydraulic circuits, and is opened on one side thereof; a lid member that is coupled so as to close the opened one side of the housing; a first piston that includes a flange portion in contact with an inner circumferential surface of the housing and a pressing portion extending from a center of the flange portion to one side of the housing, and moves forward and backward within the housing; a second piston that includes a flange portion in contact with the inner circumferential surface of the housing and a pressing portion extending from the center of the flange portion to the other side of the housing, and moves forward and backward within the housing while being spaced apart from the first piston by a predetermined interval; a spring that is interposed between the first and second pistons to provide an elastic force to the first and second pistons; and a damping member that is provided so as to surround an outer circumferential surface of the pressing portion of each of the first and second pistons, wherein an air damping space whose volume is changed in accordance with a pressure of the liquid pressure when a space between the first and second pistons is sealed is formed between the first and second pistons.

Here, a sealing member may be provided on an outer surface of the flange portion of each of the first and second pistons.

Also, a predetermined concave portion may be formed on an inner circumferential surface of the damping member or the outer circumferential surface of the pressing portion of each of the first and second pistons, and a space of the concave portion may be sealed to form an auxiliary damping space.

In addition, the damping member may include a wrinkle portion formed on an outer circumferential surface thereof.

In addition, the damping member may be made of a rubber material.

In addition, the first and second pistons may include a spring insertion groove formed on surfaces facing each other so that the spring is inserted into the spring insertion groove.

In addition, a stopper portion protruding toward the piston may be formed on the other side of the housing so that movement of the piston near the first and second pistons is restricted.

Moreover, any one of the first and second liquid pressure holes may be formed on a side surface of the stopper portion, and the remaining liquid pressure hole may be formed on one side of the outer circumferential surface of the housing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Example embodiments of the present invention are disclosed herein. However, specific structural and functional details disclosed herein are merely representative for purposes of describing example embodiments of the present invention. Example embodiments of the present invention may be embodied in many alternate forms and should not be construed as limited to example embodiments of the present invention set forth herein.

A pressure damping device according to an embodiment of the present invention is used for a brake system, and the brake system will be briefly described herein before describing the pressure damping device.

Figure 1:
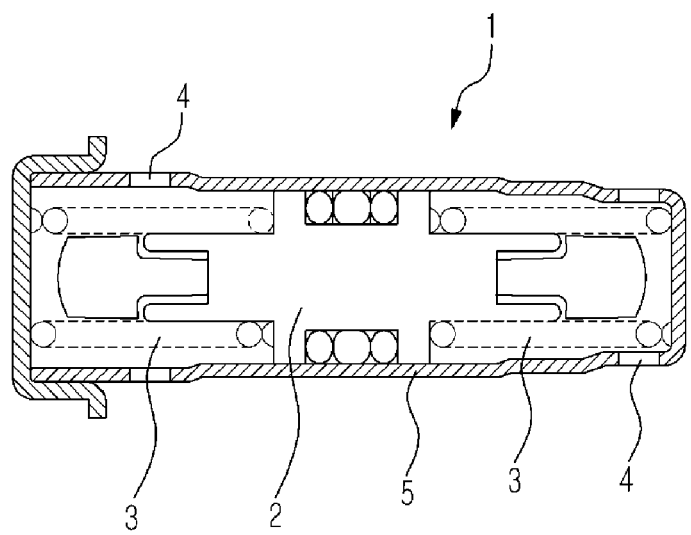
FIG. 1 is a schematic diagram showing a brake system according to the related art.
Figure 2:
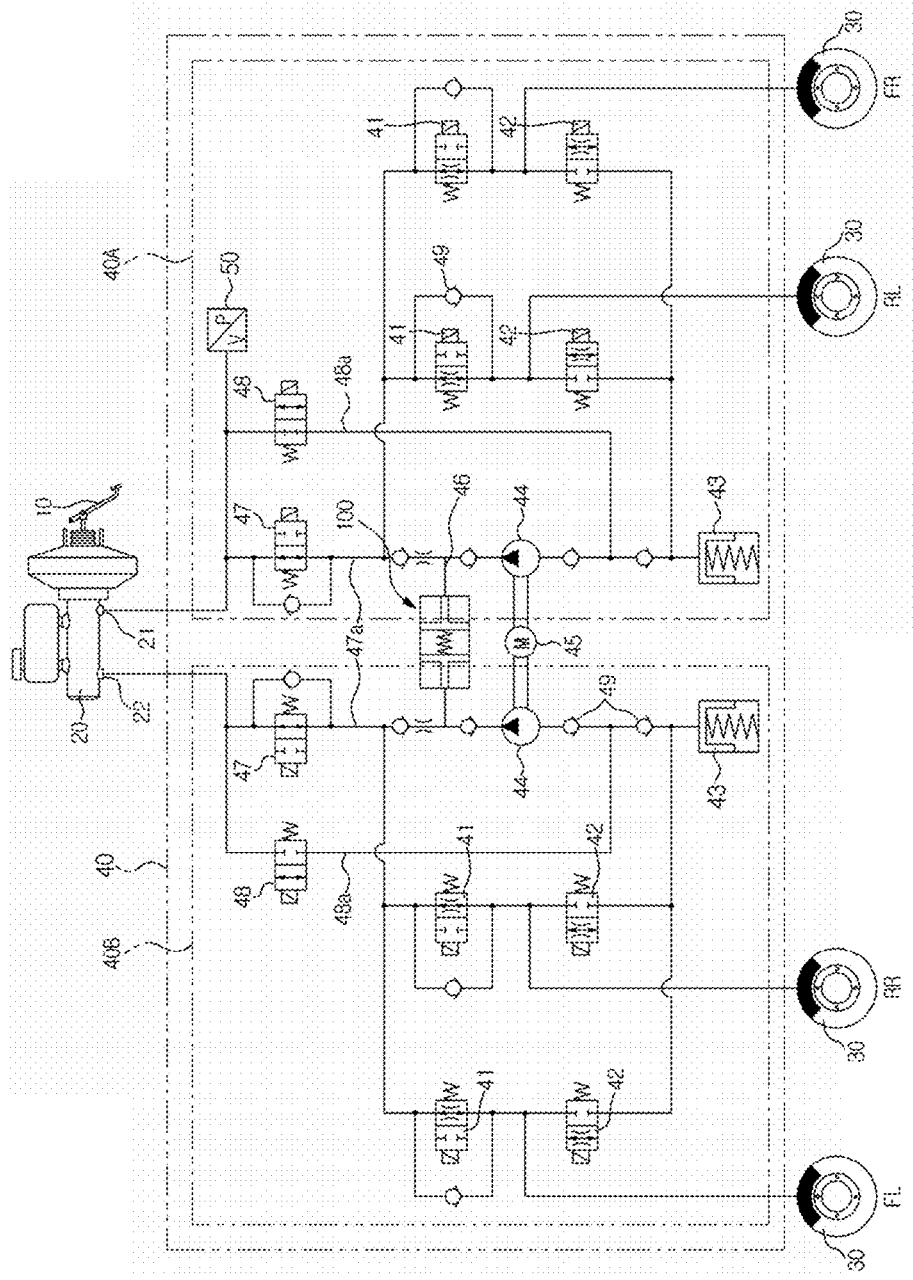
FIG. 2 is a diagram showing a brake system in which a pressure damping device according to a preferred embodiment of the present invention is provided.

FIG. 2 is a diagram showing a brake system in which a pressure damping device according to a preferred embodiment of the present invention is provided.

Referring to FIG. 2, the brake system includes a brake pedal 10 that receives an operation force of a driver, a brake booster 11 that doubles a tread force using a pressure difference between a vacuum pressure and the atmospheric pressure by a tread force of the brake pedal 10, a master cylinder 20 that causes the brake booster 11 to generate a pressure, a first hydraulic circuit 40A that connects a first port 21 of the master cylinder 20 and a wheel cylinder 30 provided in two wheels FR and RL so as to control transmission of a liquid pressure, and a second hydraulic circuit 40B that connects a second port 22 of the master cylinder 20 and the wheel cylinder 30 provided in the remaining two wheels FL and RR so as to control transmission of the liquid pressure.

The first hydraulic circuit 40A and the second hydraulic circuit 40B are provided in a hydraulic block 40 in a compact manner.

Each of the first and second hydraulic circuits 40A and 40B includes solenoid valves 41 and 42 that control a braking liquid pressure transmitted to two wheel cylinders 30 side, a pump 44 that sucks and pumps oil discharged from the wheel cylinder 30 side or oil from the master cylinder 20 by the drive of a motor 45, a low pressure accumulator 43 that temporarily stores the oil discharged from the wheel cylinder 30, a main oil passage 47a that connects an outlet of the pump 44 and the master cylinder 20, an auxiliary oil passage 48a that guides oil of the master cylinder 20 to be sucked into an inlet of the pump 44, and an electronic control unit (ECU; not shown) that controls the drive of a plurality of the solenoid valves 41 and 42 and the motor 45.

In this instance, as shown in FIG. 2, the solenoid valves 41 and 42, the low pressure accumulator 43, the pump 44, the main oil passage 47a, and the auxiliary oil passage 48a are respectively provided in the first and second hydraulic circuits 40A and 40B.

More specifically, the plurality of solenoid valves 41 and 42 are in conjunction with upstream and downstream sides of the wheel cylinder 30, and are divided into a normal open type solenoid valve 41 that is disposed on the upstream side of the wheel cylinder 30 and remains normally opened and a normal close type solenoid valve 42 that is disposed on the downstream side of the wheel cylinder 30 and remains normally closed. Opening and closing operations of the solenoid valves 41 and 42 may be controlled by the electronic control unit (not shown), and the normal close type solenoid valve 42 is opened in accordance with pressure reducing braking, so that oil discharged from the wheel cylinder 30 side may be temporarily stored in the low pressure accumulator 43.

The pump 44 may be driven by the motor 45 so as to suck and discharge the oil stored in the low pressure accumulator 43, and therefore a liquid pressure is transmitted to the wheel cylinder 30 side or the master cylinder 20 side.

In addition, in the main oil passage 47a for connecting the master cylinder 20 and the outlet of the pump 44, a normal open type solenoid valve 47 (hereinafter, referred to as "TC valve") for traction control (TCS) is provided. The TC valve 47 remains normally opened and allows a braking liquid pressure formed in the master cylinder 20 at the time of general braking through the brake pedal 10 to be transmitted to the wheel cylinder 30 side through the main oil passage 47a.

In addition, the auxiliary oil passage 48a is branched from the main oil passage 47a and guides oil of the master cylinder 20 to be sucked into the inlet side of the pump 44. In the auxiliary oil passage 48a, a shuttle valve 48 for causing the oil to flow only to the inlet of the pump 44 is provided. The shuttle valve 48 that is electrically operated is provided in the middle of the auxiliary oil passage 48a so that the shuttle valve 48 is normally closed but opened in a TCS mode.

Meanwhile, a reference numeral "49" which is not described refers to a check valve that is provided in an appropriate position of the oil passage in order to prevent reverse flow of oil, and a reference numeral "50" refers to a pressure sensor that detects a braking pressure transmitted to the TC valve 47 and the shuttle valve 48.

In the above-described brake system, a pressure pulsation is generated from a liquid pressure pumped from the pump 44 in accordance with the operation of the motor 45 when braking. Here, the pressure pulsation is reduced when a change in a space occurs. Therefore, according to the present embodiment, in order to reduce the pressure pulsation, a pressure damping device 100 that is provided in the oil passage 46 for connecting two hydraulic circuits 40A and 40B is provided.

Figure 3:
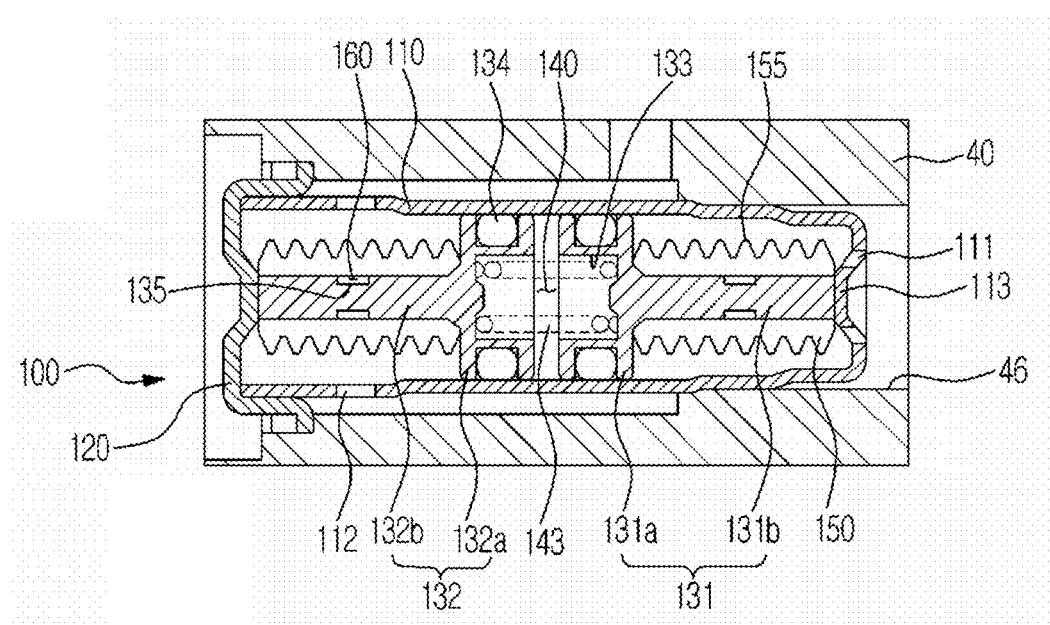
FIG. 3 is a cross-sectional diagram showing a main portion of a pressure damping device of a brake system according to a preferred embodiment of the present invention.

FIG. 3 is a cross-sectional diagram showing a main portion of a pressure damping device of a brake system according to a preferred embodiment of the present invention.

Referring to FIG. 3, the damping device 100 according to the present invention includes a cylindrical housing 110 that is fixed to an oil passage 46 of a hydraulic block 40 so as to connect first and second hydraulic circuits 40A and 40B and is opened on one side thereof, a lid member 120 that closes the opened one side of the housing 110, first and second pistons 131 and 132 that move forward and backward within the housing 110 while being spaced apart from each other, a spring 143 that is interposed between the first and second pistons 131 and 132 to provide an elastic force to the first and second pistons 131 and 132, and a damping member 150 that is provided in each of the first and second pistons 131 and 132.

The housing 110 is inserted and fixed to the oil passage 46 for connecting the first and second hydraulic circuits 40A and 40B, that is, the oil passage 46 for connecting outlet sides of the two pumps 44. The housing 110 is formed in a cylindrical shape with one side opened, and the opened one side is closed by the lid member 120. In addition, in the housing 110, first and second liquid pressure holes 111 and 112 that respectively communicating with the main oil passage 47a of the first and second hydraulic circuits 40A and 40B are formed. For example, the first liquid pressure hole 111 is formed on one side of the housing 110 so as to communicate with the main oil passage 47a of the first hydraulic circuit 40A, and the second liquid pressure hole 112 is formed on the other side of the housing 110 so as to communicate with the main oil passage 47a of the second hydraulic circuit 40B. As shown in FIG. 3, the first liquid pressure hole 111 is formed in a stopper portion 113 which will be described later, and the second liquid pressure hole 112 is formed on an outer circumferential surface of the housing 110. Therefore, a liquid pressure discharged from the pump 44 through each of the liquid pressure holes 111 and 112 is transmitted into the housing 110. In this instance, a formation position of the first liquid pressure hole 111 will be described again later.

The first and second pistons 131 and 132 are spaced apart from each other by a predetermined interval and move forward and backward within the housing 110. More specifically, the first piston 131 includes a flange portion 131a in contact with an inner circumferential surface of the housing 110 and a pressing portion 131b extending to one side of the housing 110 from a center of the flange portion 131a. In addition, the second piston 132 includes a flange portion 132a in contact with an inner circumferential surface of the housing 110 and a pressing portion 132b extending to the other side of the housing 110 from a center of the flange portion 132a. In this instance, the pressing portion 131b of the first piston 131 is provided so as to be brought into contact with the other side of the stopper portion 113 of the housing 110 which will be described alter, and the pressing portion 132b of the second piston 132 is provided so as to be brought into contact with the lid member 120. Here, the first and second pistons 131 and 132 are spaced apart from each other.

In addition, the spring 143 is interposed between the first and second pistons 131 and 132 to provide an elastic force to each of the pistons 131 and 132. As shown in FIG. 3, a spring insertion groove 133 is formed on surfaces facing each other in each of the flange portions 131a and 132a of the first and second pistons 131 and 132 so that the spring 143 is inserted into the spring insertion groove 133, whereby the spring 143 may be stably provided. In this instance, the spring insertion groove 133 is formed, and therefore a volume of the piston is reduced compared to the related art.

According to the present embodiment, a sealing member 134 is provided on an outer surface of each of the flange portions 131a and 132a of the pistons 131 and 132, so that a space between the first and second pistons 131 and 132 is sealed. As a result, an air damping space 140 whose volume is changed in accordance with a pressure of a liquid pressure is formed between the first and second pistons 131 and 132.

The air damping space 140 is provided so as to reduce a pressure pulsation generated by the liquid pressure discharged from the outlet of the pump 44, and the volume of the air damping space 140 may be changed. That is, when the liquid pressure is transmitted to any one of the first and second liquid pressure holes 111 and 112, the piston located in a direction in which the liquid pressure is transmitted is moved to the opposite piston, and in this instance, the shock may be absorbed by the spring 143 and the air damping space 140 and at the same time the pressure pulsation may be reduced.

Therefore, more excellent effects of reducing the pressure pulsation may be obtained compared to the related art in which the pressure pulsation is reduced only by the load of the spring 143.

Meanwhile, the damping member 150 may be provided so as to surround the pressing portions 131b and 132b of the first and second pistons 131 and 132. The damping member 150 absorbs the shock when the pistons 131 and 132 are pressurized by the liquid pressure, and is preferably made of a rubber material. In this instance, a wrinkle portion 155 is formed on an outer circumferential surface of the damping member 150 so as to allow the damping member 150 to smoothly absorb the shock. That is, when the liquid pressure is transmitted from the outlet of the pump 44, the damping member 150 is elastically deformed by the wrinkle portion 155 and at the same time absorbs the shock to reduce the pressure pulsation.

According to an embodiment of the present invention, an auxiliary damping space 160 is formed between the above-described damping member 150 and each of the pistons 131 and 132. For example, a predetermined concave portion 135 is formed on an inner circumferential surface of the damping member 150 or the outer circumferential surface of each of the pressing portions 131b and 132b of the first and second pistons 131 and 132, and a space of the concave portion 135 is sealed to form the auxiliary damping space 160.

As shown in FIG. 3, the concave portion 135 is formed on the outer circumferential surface of each of the pressing portions 131b and 132b of the first and second pistons 131 and 132, and is formed as the auxiliary damping space 160. That is, the auxiliary damping space 160 is formed so as to reduce a pressure pulsation and may reduce the pressure pulsation together with the air damping space 140 when a liquid pressure is generated. That is, the pressure pulsation is doubly reduced, thereby maximizing damping effect. Therefore, when the liquid pressure is transmitted, the pressure damping device 100 according to the present embodiment may reduce the pressure pulsation through the air damping space 140 and the auxiliary damping space 160 while absorbing the shock by the spring 143 and the damping member 150, and therefore superior damping effect may be obtained compared to the related art.

In addition, the stopper portion 113 protruding toward the first piston 131 is provided on the other side of the housing 110. The stopper portion 113 may restrict a movement distance of the piston. In this instance, on a side surface of the protruding stopper portion 113, the first liquid pressure hole 111 is formed as described above. This is to prevent the damping member 150 from being broken by the first liquid pressure hole 111 when the damping member 150 provided in the first piston 131 is brought into contact with the other side of the housing 110, that is, the stopper portion 113.

Here, an alternative is to form the first liquid pressure hole 111 on the other side end cross-section of the housing 110 so as to prevent the damping member 150 and the first liquid pressure hole 111 from being brought into contact with each other.

Consequently, the damping device 100 according to the present embodiment is provided in the brake system, and therefore the pressure pulsation due to the liquid pressure discharged from the pump 44 may be minimized, thereby reducing noise and providing appropriate pedal feel to a driver.

In addition, the air damping space 140 is provided between the first and second pistons 131 and 132 and the spring insertion groove 133 is formed, and therefore the volume of the piston is significantly reduced compared to the related art, thereby reducing costs of the parts and a weight of the product.

As described above, according to the embodiments of the present invention, the pressure damping device for the brake system may absorb the shock through the damping member and the spring, and doubly perform damping by the air damping space whose volume is changed in accordance with the liquid pressure between two pistons, thereby improving the pressure pulsation reducing effect.

In addition, the auxiliary damping space is provided between each piston and the damping member, and therefore damping is additionally performed, thereby maximizing the pressure pulsation reducing effect. As a result, noise may be reduced, and pedal feel may be improved.

In addition, the air damping space is formed between two pistons, and therefore the volume of the piston is reduced compared to the piston according to the related art, thereby reducing the weight of the piston and costs of the parts.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pressure damping device for a brake system that is provided in an oil passage of a hydraulic block so as to connect first and second hydraulic circuits for respectively controlling a liquid pressure transmitted to two wheels, the pressure damping device comprising:

a cylindrical housing that is fixed to the oil passage, includes a first liquid pressure hole and a second liquid pressure hole respectively communicating with main oil passages of the first and second hydraulic circuits, and is opened on one side thereof;

a lid member that is coupled so as to close the opened one side of the housing; a first piston that includes a flange portion in contact with an inner circumferential surface of the housing and a pressing portion extending from a center of the flange portion to one side of the housing, and moves forward and backward within the housing;

a second piston that includes a flange portion in contact with the inner circumferential surface of the housing and a pressing portion extending from the center of the flange portion to the other side of the housing, and moves forward and backward within the housing, the second piston being spaced apart from the first piston by a predetermined interval;

a spring that is interposed between the first and second pistons to provide an elastic force to the first and second pistons; and a damping member that is provided so as to surround an outer circumferential surface of the pressing portion of each of the first and second pistons, wherein an air damping space whose volume is changed in accordance with a pressure of the liquid pressure when a space between the first and second pistons is sealed is formed between the first and second pistons.

2. The pressure damping device according to claim 1, wherein a sealing member is provided on an outer surface of the flange portion of each of the first and second pistons.

3. The pressure damping device according to claim 1, wherein a predetermined concave portion is formed on an inner circumferential surface of the damping member or the outer circumferential surface of the pressing portion of each of the first and second pistons, and a space of the concave portion is sealed to form an auxiliary damping space.

4. The pressure damping device according to claim 1, wherein the damping member includes a wrinkle portion formed on an outer circumferential surface thereof.

5. The pressure damping device according to claim 1, wherein the damping member is made of a rubber material.

6. The pressure damping device according to claim 1, wherein the first and second pistons include a spring insertion groove formed on surfaces facing each other so that the spring is inserted into the spring insertion groove.

7. The pressure damping device according to claim 1, wherein a stopper portion protruding toward the piston is formed on the other side of the housing so that movement of the piston near the first and second pistons is restricted.

8. The pressure damping device according to claim 7, wherein any one of the first and second liquid pressure holes is formed on a side surface of the stopper portion, and the remaining liquid pressure hole is formed on one side of the outer circumferential surface of the housing.

* * * * *